United States Patent [19]
Berg et al.

[11] Patent Number: 5,980,324
[45] Date of Patent: Nov. 9, 1999

[54] GUIDE RAIL SYSTEM WITH INTEGRATED WEDGE CONNECTOR FOR REMOVABLE TRANSCEIVER

[75] Inventors: Jerry Berg; David Peter Gaio; William Kim Hogan, all of Rochester, Minn.

[73] Assignee: International Business Machines Corporation, Armonk, N.Y.

[21] Appl. No.: 09/215,977

[22] Filed: Dec. 18, 1998

[51] Int. Cl.$^6$ .................................................. H01R 23/70
[52] U.S. Cl. ............................................................ 439/630
[58] Field of Search .............................. 174/59; 439/342, 439/180, 260, 267, 630, 632, 633, 681, 762, 775, 358, 357, 660; 385/88, 89; 361/730, 728, 775

[56] References Cited

U.S. PATENT DOCUMENTS

| | | | |
|---|---|---|---|
| 4,448,467 | 5/1984 | Weidler | 439/80 |
| 4,900,263 | 2/1990 | Manassero et al. | 439/358 |
| 5,125,846 | 6/1992 | Sampson et al. | 439/66 |
| 5,181,852 | 1/1993 | Dambach et al. | 439/52 |
| 5,554,840 | 9/1996 | Saroya | 235/441 |
| 5,757,998 | 5/1998 | Thatcher et al. | 385/75 |
| 5,775,949 | 7/1998 | Bricaud et al. | 439/630 |

*Primary Examiner*—Kheim Nguyen
*Assistant Examiner*—Michael C. Zarroli
*Attorney, Agent, or Firm*—Lawerence D. Maxwell

[57] ABSTRACT

An electrical connector includes a body and two or more electrical contacts. The body has a guide member elongated between a first end and a second end along a first axis and has a connector block at the first end. The connector has a very low profile (preferably, less than about 10 mm), and the bottom of the body is surface-mountable on a circuit board. The connector block retains the contacts, which are spaced from one another in the direction of the first axis. The upper portions of contacts nearer the first end of the body extend higher above the circuit board on which the connector is mounted than contacts nearer the second end. In other words, the upper portions of the contacts together present a surface that is generally inclined or angled with respect to the bottom surface of the connector and the surface of the circuit board on which it is mountable. When a mating connector having complementary contacts that together present a surface inclined at a complementary angle is, guided by the guide member, moved in the direction of the first axis toward the connector block, the contacts of the electrical connector and mating connector make electrical contact with minimal wiping. The connector block may be wedge-shaped, with its upper surface defining the inclined surface in which the upper portions of the contacts are retained. The vertex of the inclination angle defines a second axis perpendicular to the first axis. The electrical contacts may be arrayed in two or more rows, each parallel to the second axis and having two or more contacts.

34 Claims, 5 Drawing Sheets

GUIDE RAIL SYSTEM WITH INTEGRATED WEDGE CONNECTOR FOR REMOVABLE TRANSCEIVER

CROSS-REFERENCE TO RELATED APPLICATION

Co-pending application Ser. No 09/216104, entitled "GUIDE RAIL AND CAM SYSTEM WITH INTEGRATED CONNECTOR FOR REMOVABLE TRANSCEIVER" is related.

BACKGROUND OF THE INVENTION

Field of the Invention

The present invention relates generally to electronic connector systems and, more specifically, to low-profile connector systems for user-removable electronic modules, such as transceiver modules that interface with a peripheral device port of a portable computer.

Description of the Related Art

Electrical connectors are used to interconnect circuit cards and other electronic modules or assemblies. A connector commonly used in personal computer systems is known as a D-shell connector because the contact pins of the male connector and female connector are enclosed within generally D-shaped structures that mate to promote a secure mechanical connection as well as provide electromagnetic shielding. In a D-shell connector, contact pins of the male connector are frictionally received in contact holes of the female connector. The wiping action between the pins and holes minimizes the buildup of oxides or dirt that could impede electrical conduction. Connectors that have wiping mating parts define one of a number of general categories of connectors.

Figure 1A:
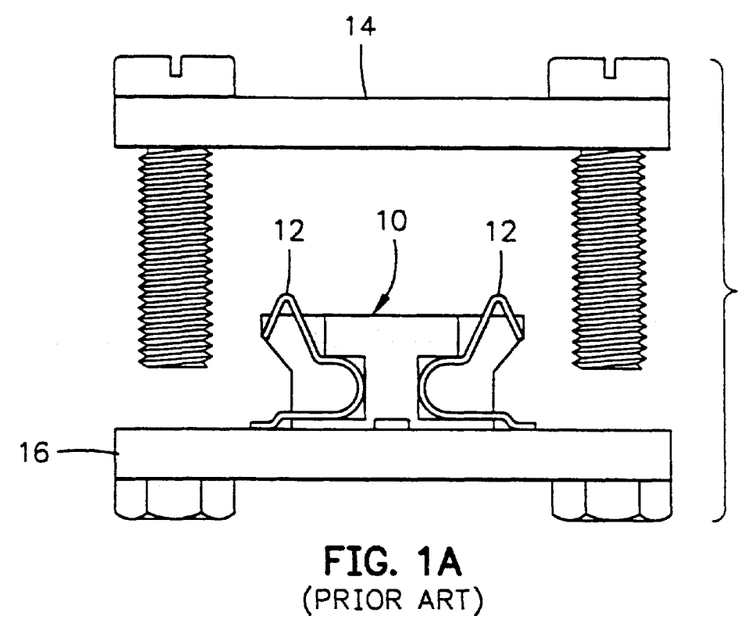
FIG. 1A is an end view of a prior art J-lead connector for coupling two circuit boards.
Figure 1B:
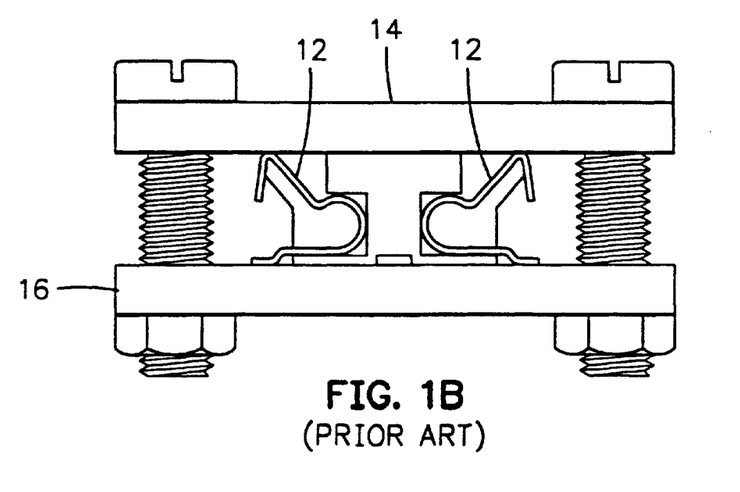
FIG. 1B is similar to FIG. 1A and illustrates the completion of electrical contact between the circuit boards using the J-lead connector.

Another general category of connectors is defined by those connectors that have abutting mating parts. One such connector, illustrated in FIG. 1A, is known as the J-lead connector (10) because the electrical contacts 12 are generally J-shaped. A J-lead connector 10 is typically used to interconnect two circuit cards 14 and 16 that are disposed in a back-to-back orientation. The J-lead connector 10 is mounted on one of the circuit cards, typically by soldering one end of each contact 12 to a surface-mount pad (not shown) on the circuit card. The shape of contacts 12 provides some resiliency or springiness, and when circuit cards 14 and 16 are brought together, as illustrated in FIG. 1B, pads (not shown) on circuit card 16 make electrical and mechanical contact with contacts 12 of circuit card 16. Contacts 12 are deflected slightly, and the spring force exerted by the deflected contacts 12 against the contact pads promotes good electrical connection.

Various international and industry standards define the type of connectors used to interface personal computers to external communication devices such as modems, network interfaces, and other transceivers. A well-known type of transceiver developed by an industry consortium and known as a gigabit interface converter (GBIC) or serial optical converter (SOC) provides an interface between a computer and an Ethernet, Fibre Channel or other data communication environment. The D-shell connectors of such transceivers mate with a complementary D-shell connector mounted on the circuit card of the host computer.

It is desirable to miniaturize transceivers in order to increase the port density associated with the network connection (switch boxes, cabling patch panels, wiring closets, computer I/O, etc.). Various standards are known that define form factors for miniaturized electronic devices, such as the Small Form Factor (SFF) standard that specifies an enclosure 9.8 mm in height by 13.5 mm in width and having a minimum of 24 electrical input/output connections. Miniaturizing a transceiver, however, raises a number of potential connector problems. These problems and deficiencies are satisfied by the present invention in the manner described below.

SUMMARY OF THE INVENTION

The present invention relates to an electrical connector system having two mating connectors in which one of the electrical connectors includes a body and two or more electrical contacts. The body of that electrical connector is definable by three mutually perpendicular axes and has a connector block. The body, including the connector block, has a very low profile, and in certain exemplary embodiments it is preferably less than about 10 mm in height, i.e., the dimension defined by the third axis, to accommodate the Small Form Factor standard and to facilitate surface-mounting the bottom of the body on a circuit board. The connector block retains the contacts, which are spaced from one another in the direction of the first axis. The upper portions of contacts nearer the first end of the body extend higher above the circuit board on which the connector is mounted than contacts nearer the second end. In other words, the upper portions of the contacts together define a surface that is generally inclined or angled with respect to the bottom surface of the connector and the surface of the circuit board on which it is mountable. One of the connectors includes a guide rail to facilitate mechanical mating of the connectors. In an exemplary embodiment, the connector block is at one end of the guide rail, which is elongated between a first end and second end of the body along a first axis. When a mating connector having complementary contacts that together present a surface inclined at a complementary angle is, guided by the guide member, moved in the direction of the first axis toward the connector block, the contacts of the electrical connector and mating connector make electrical contact with minimal wiping. Essentially all of the relative motion between the connectors is in the direction of the first axis. Nevertheless, the contacts are preferably somewhat resiliently deflectable to promote good electrical contact.

The connector block may have a wedge shape that follows the generally inclined surface, with the upper portions of the contacts retained in the upper surface of the connector block. The vertex of the inclination angle defines a second axis perpendicular to the first axis. Nevertheless, the connector block may have any suitable shape, and the inclined surface may be defined by another structure or structures, including the electrical contacts themselves. The inclined surface may be planar or may have any other suitable shape or contour that allows the connectors to be mated in the manner described above.

The electrical contacts may be arrayed in two or more rows, each parallel to the second axis and having two or more contacts.

In an exemplary embodiment, the mating electrical connector that mates with the electrical connector having the body and connector block is included in an optical transceiver module. Nevertheless, the connector system may be used in other arrangements and to couple other types of electronic modules or assemblies.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 2:
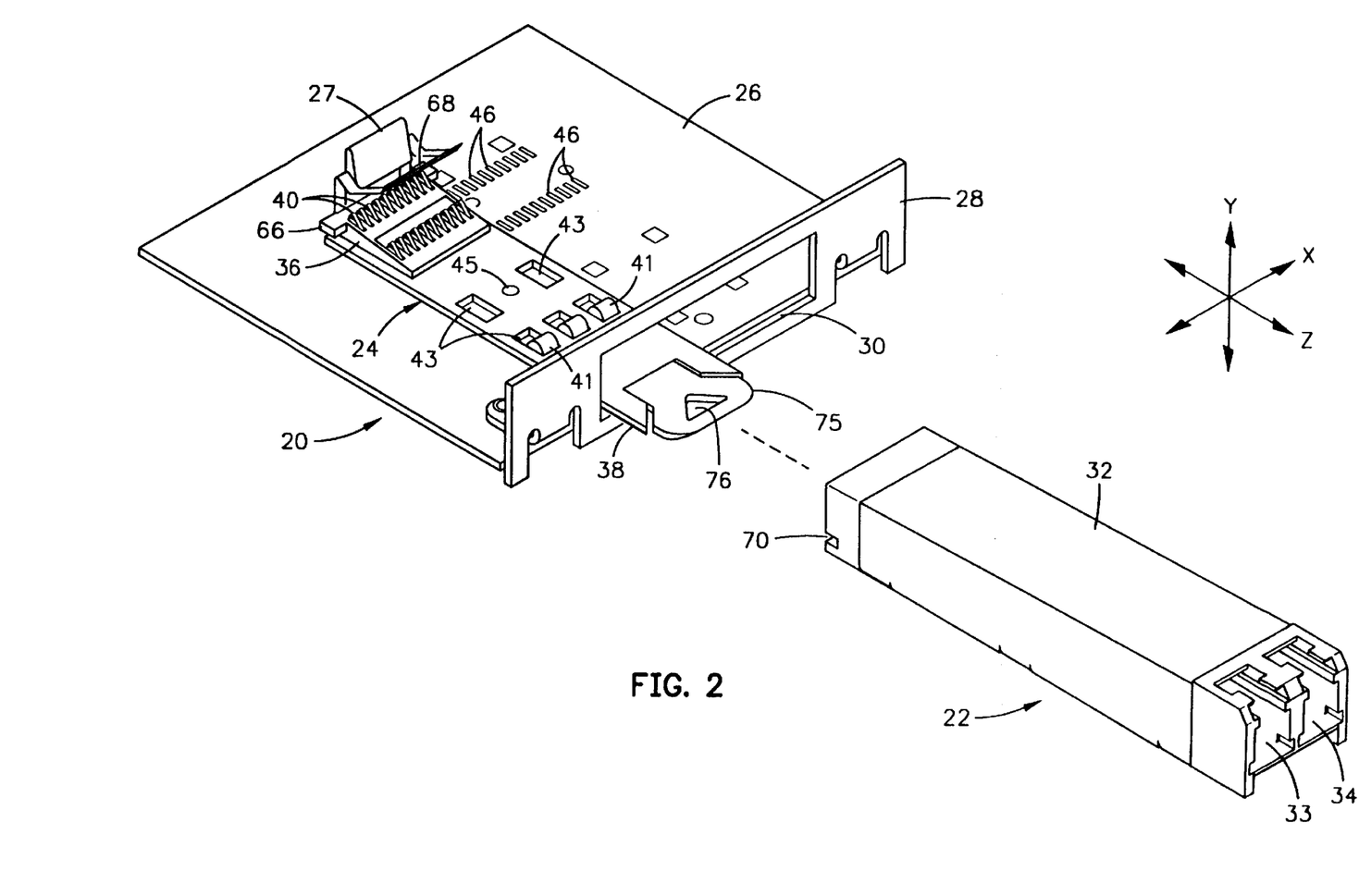
FIG. 2 is a perspective view of the connector system, showing an electronic assembly having a wedge connector mateable with a transceiver module.
Figure 3:
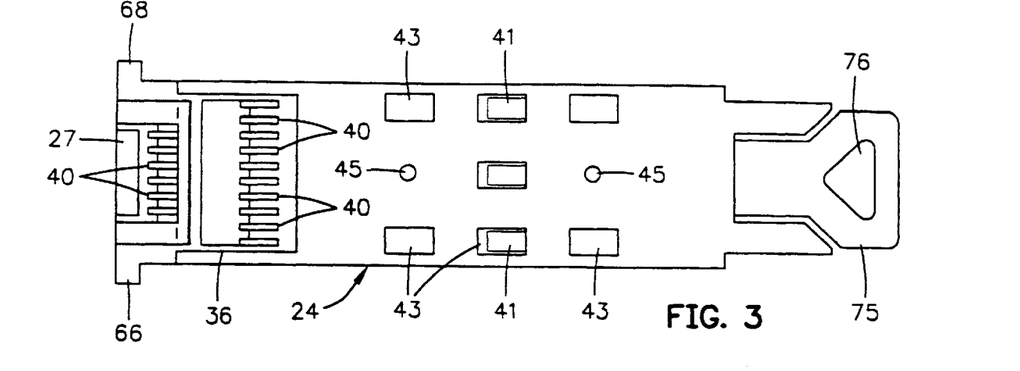
FIG. 3 is a top plan view of the wedge connector.
Figure 4:
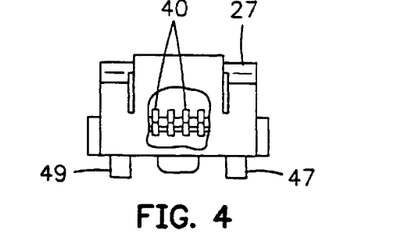
FIG. 4 is an end view of the wedge connector.
Figure 5:
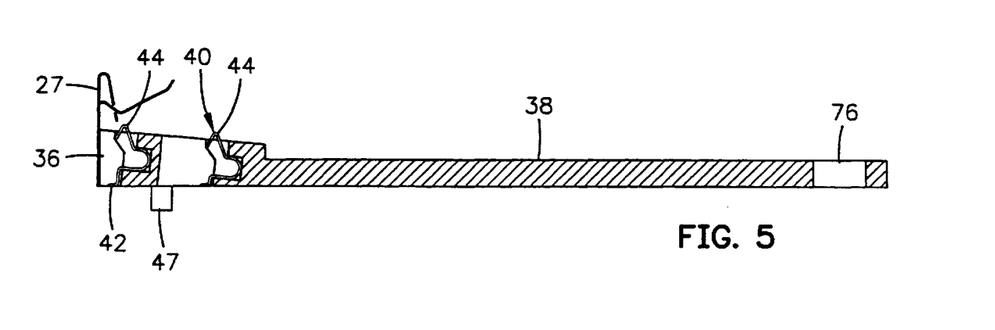
FIG. 5 is a sectional view of the wedge connector.
Figure 9:
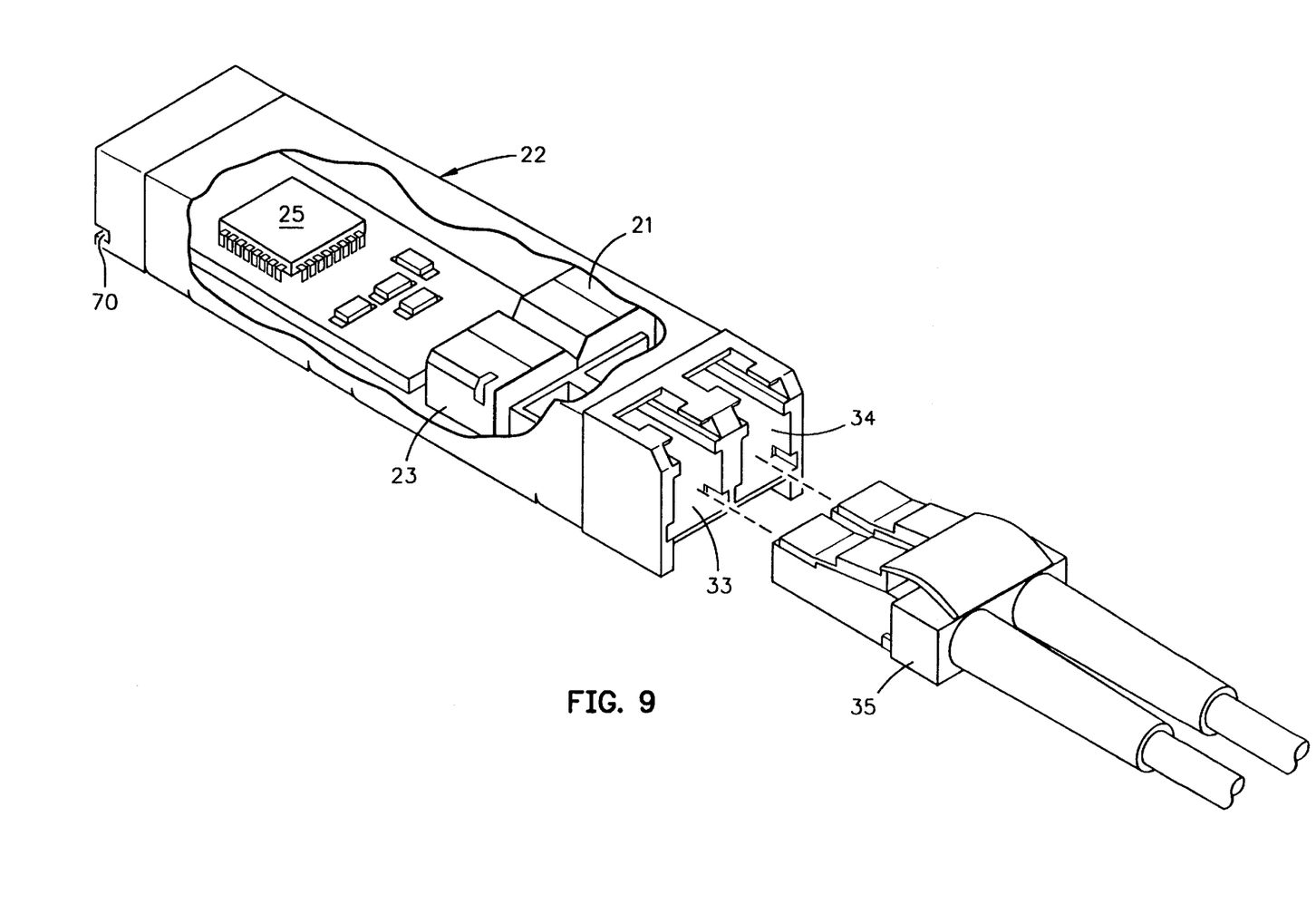
FIG. 9 is a perspective view of the transceiver module, partially cut away to show the transceiver circuitry, illustrating the transceiver module mating with an optical cable.

As illustrated in FIG. 2, a peripheral device port assembly 20 for a personal computer or similar device (not shown) is electrically and mechanically mateable with a data transceiver module 22. Transceiver module 22 is preferably of the GBIC or SOC type and, as illustrated in FIG. 9, includes suitable optical transceiver electronics, such as a laser photodiode-based transmitter 21, a photodetector-based receiver 23, and suitable integrated circuit chips 25 that contain laser driver preamplifiers and other circuitry of the type conventionally included in optoelectronic transceivers. Module 22 receives and transmits serial optical data and serial electrical data, although parallel optical and/or parallel electrical transmission and reception is also contemplated within the realm of this invention. Module 22 communicates electrical signals to and from peripheral device port assembly 20 using the electrical connector system described below.

Assembly 20 includes a wedge electrical connector 24 surface-mounted as described in further detail below on a printed circuit board 26. A spring clip 39 is also surface-mounted on circuit board 26. Assembly 20 also includes a bracket 28 mounted perpendicularly to circuit board 26. Bracket 28 has a rectangular opening 30 with substantially industry-standard dimensions that facilitate receiving a circuit card module (not shown) conforming to the PCMCIA standard. In use assembly 20 can be mounted in an orientation with bracket 28 parallel to and abutting a wall of a computer enclosure having a correspondingly dimensioned opening. Because the novel connector system of the present invention is mateable through a port opening 30 having standard PCMCIA dimensions, connector 24 of the system can be mounted on an essentially standard peripheral device port assembly 20. In other words, computer device manufacturers can readily adapt their existing assemblies of this type to include the novel connector system of the present invention in place of conventional connector systems, such as those that use D-shell connectors.

A particular advantage of the connector system of the present invention, however, is that module 22 can conform to the Small Form Factor (SFF) standard. In accordance with the SFF standard, module 22 preferably has an enclosure 32 that is less than 9.8 mm in height and 13.5 mm in width. Accordingly, opening 30 has a height less than 9.8 mm to facilitate insertion of module 22 through it. As used in this patent specification, the term "width" refers to the dimension or axis labeled "X" in FIG. 2, and the term "height" refers to the dimension or axis labeled "Y" in FIG. 2. In view of the increasing desire in the industry to miniaturize communication transceivers in order to increase port density, it has been suggested that newer transceivers that conform to the SFF standard have connectors that resemble a standard RJ45 telephone jack, which is about 13.5 mm wide. Module 22 has optical input and output connectors 33 and 34 that, as illustrated in FIG. 9, are optically and mechanically mateable with an optical cable connector assembly 35. Module 22 thus receives serial optical signals at one end from optical cable connector assembly 35, converts them to electrical signals, and provides the electrical signals at the other end to assembly 20. Likewise, module 22 receives serial electrical signals at one end from assembly 20, converts them to optical signals, and provides the optical signals at the other end to optical cable connector assembly 35.

With further reference to FIGS. 3–6, connector 24 includes a wedge-shaped connector block 36 and an elongated, flat or tongue-shaped guide rail 38. Connector 24 may comprise any suitable number of parts. For example, although in the illustrated embodiment connector block 36 is integrally formed with guide rail 38, they may be separate parts attached during manufacturing. Guide rail 38 is elongated in the dimension or axis labeled "Z" in FIG. 2. Connector 24, including connector block 36 and guide rail 38, is preferably no wider than about 12 mm. This miniaturization allows two or more such connectors 24 to be mounted side-by-side in a standard PCMCIA-width opening 30 to increase port density.

Two (or more in other embodiments) rows of electrical contacts 40 oriented in the X direction are mounted in connector block 36. Electrical contacts 40 are of the conventional J-lead type. That is, each contact 40 is a wire-like or strip-like member having a surface-mountable lower portion 42 connected via a generally U-shaped or J-shaped bend to an upper portion 44 that is somewhat resiliently deflectable with respect to lower portion 42. (See FIGS. 5–6.) Lower portion 42 of each contact 40 is essentially flush with the lower surface of connector block 36, protruding only slightly to facilitate surface-mounting to pads 46 of circuit board 26 (FIG. 2). Circuit board 26 may comprise any suitable type of rigid or flexible printed circuit substrate, and conventional solder reflow processes can be used to surface-mount contacts 40. Upper portion 44 of each contact 40 protrudes slightly from the upper surface of connector block 36 to facilitate electrical contact, as described below. The upper surface of connector block 36 is substantially planar and substantially parallel to the plane defined by upper portions 44 collectively. The upper surface of connector block 36 is inclined with respect to the lower surfaces of connector 24 and defines the wedge shape of connector block 36. The inclination angle or base angle of the wedge shape, which has a vertex line oriented in the X direction, is preferably about seven degrees. The height of wedge-shaped connector block 36 is defined by the Y direction. Although the plane defined by the collective array of upper portions 44 is parallel to the upper surface of connector block 36 and thus inclined at the same angle as that upper surface in the illustrated embodiment, it should be noted that in other embodiments the upper surface of connector block 36 could have a different shape, because the important aspect is that the plane defined by the collective upper portions 44 is inclined and not necessarily that the surface beneath them in which they are mounted is inclined. Indeed, in other embodiments connector block 36 may not itself be wedge-shaped, or the upper surface of connector block 36 may be non-planar. In any event, the lower surfaces of connector block 36 and the upper and lower surfaces of guide rail 38 are mutually parallel in the illustrated embodiment and, when connector 24 is mounted on circuit board 26, are parallel to circuit board 26 as well.

Electrical coupling between connector 24 and surface-mount pads of circuit board 26 is achieved through, in addition to contacts 40, a grounding strip having three upper contact portions 41. Upper contact portions 41 protrude through three of the seven apertures 43 in guide rail 38 a sufficient distance above the upper surface of guide rail 38 to resiliently contact mating grounding contacts (not shown) inside module 22. The grounding strip has seven lower contact portions (not shown) that protrude through all seven apertures 43 sufficiently to surface-mount them to pads on circuit board 26 on which a signal at ground potential would exist during operation of the system. Although the contemplated purpose of contact portions 41 is grounding, in other embodiments of the invention such secondary contacts may be used for communication of other types of signals. Two holes 45 through guide rail 38 and two pins 47 and 49 extending perpendicularly from the lower surface of guide rail 38 facilitate mounting connector 24 on circuit board 26.

Figure 7:
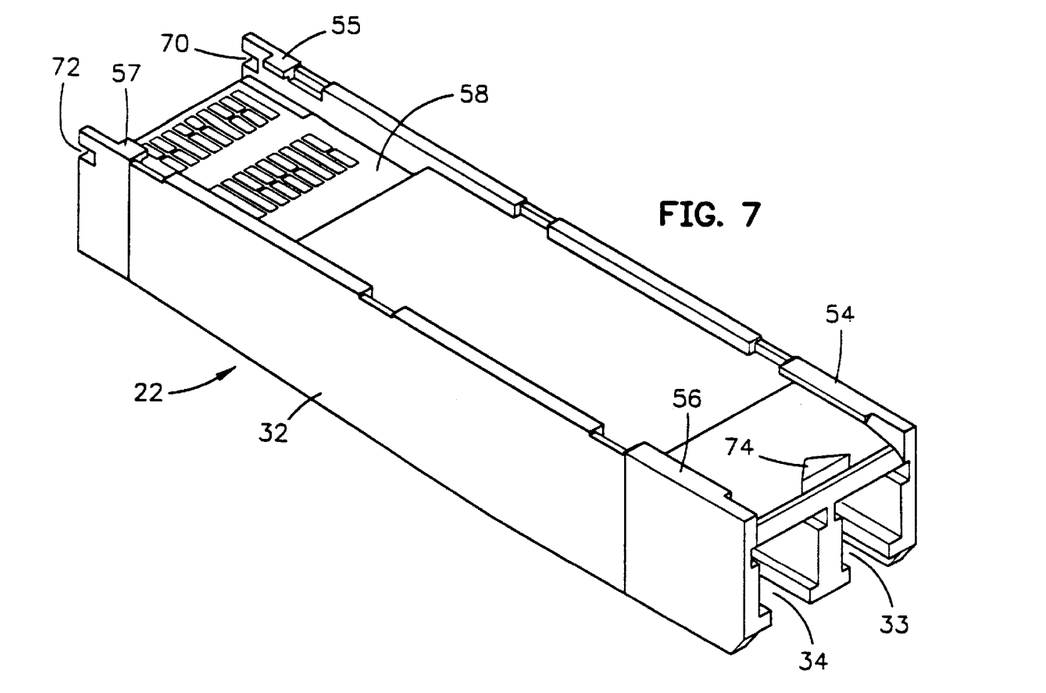
FIG. 7 is a perspective view showing the bottom of the transceiver module.

To use the connector system, a user engages the forward end of module 22 on guide rail 38. As illustrated in FIG. 7, flanges 54, 55, 56 and 57 on the lower edges of the side walls of enclosure 32 define channels in which guide rail 38 fits closely. Thus, module 22 is guided by guide rail 38 as the user continues to slide module 22 in the direction of connector block 24, i.e., in the Z direction. In this orientation, flanges 54–57 are substantially parallel to circuit board 26 and may slide upon its surface to some extent.

Figure 6:
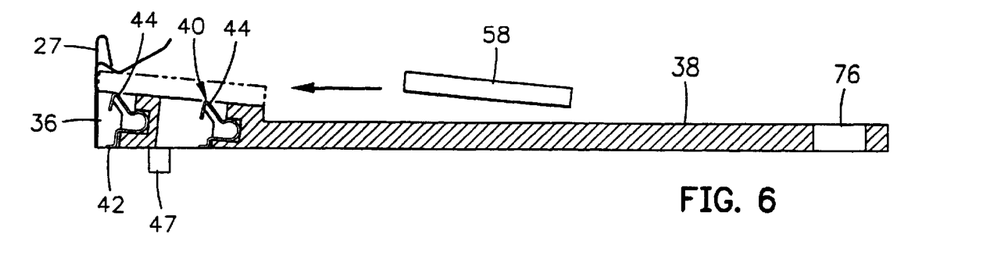
FIG. 6 is similar to FIG. 5 and illustrates the mating action between the wedge connector and a circuit board of the transceiver module.
Figure 8:
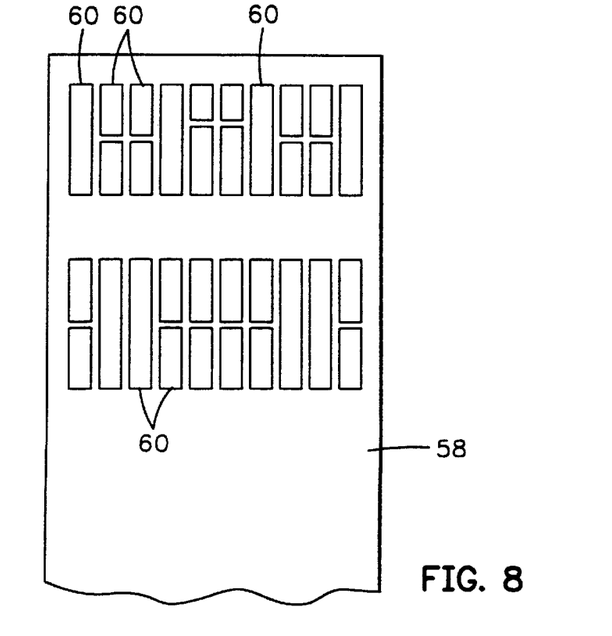
FIG. 8 is a top plan view of the contact pads of the transceiver module circuit board.

As illustrated in FIG. 6, illustrating this mating action, module 22 has an internal circuit board 58 that is inclined with respect to edges 54 and 56 at the same angle as the wedge shape of connector block 36 is inclined with respect to its lower surface and, when mounted, circuit board 26. As illustrated in FIG. 8, the lower surface of circuit board 58 has electrical contact pads 60. Contact pads 60 are arranged in a complementary manner with respect to contacts 40 in connector block 36. In other words, the position of each contact pad 60 on circuit board 58 mirrors the position of a contact 40 in connector block 36. Contact pads 60 are preferably of different lengths to provide a signal connection sequencing function when electrical contact is made, as described below.

Returning to FIG. 6, as the forward end of module 22 approaches connector block 36, circuit board 58 approaches the upper surface of connector block 36 in an orientation parallel to that surface and, accordingly, parallel to the plane defined by the collective upper portions 44 of contacts 40. Contact pads 60 of circuit board 58 make contact with upper portions 44 of contacts 40, deflecting them slightly in the Y direction. It is important to note that upper portion 44 of any given contact 40 is lower, i.e., closer in the Y direction to the lower surfaces of connector 24, than the upper portion 44 of a contact 40 that is aligned with the given contact 40 but further in the Z direction from the wedge vertex. In other words, upper portions 44 are arranged like seats in a stadium, with those seats closer to the playing field being lower, i.e., closer to the field level, than those seats that are directly behind and further from the playing field.

When contact pads 60 make contact with upper portions 4A, a small amount of wiping, i.e., relative movement in the Z direction, may occur. This small amount of wiping is beneficial because it cleans the contacting surfaces of oxides and dirt, thereby promoting good electrical contact. Nevertheless, to minimize wear, contacts 40 may be made of a gold-plated nickel-palladium alloy. Such electrical contact compositions are well-known to persons skilled in the art to which the invention pertains.

The small amount of wiping can also be used advantageously to sequence electrical signal connections and allow hot-plugging, i.e. plugging transceiver module 22 into electrical connector 24 while electrical power remains applied. With reference to FIG. 8, the longest contact pads 60 make contact first, and the shortest contact pads 60 make contact last. (Note that the shorter contact pads 60 are aligned end-to-end with dummy pads having no electrical connection.) Longer contact pads 60 remain in contact with their complementary contacts 40 while the shorter contact pads 60 make contact with their complementary contacts 40. It is desirable in the art for hot-pluggable connector systems to connect a ground signal first, then connect a power signal, and connect data signals last.

As module 22 nears the end of its travel, spring clip 27 engages the upper surface of circuit board 58 and makes contact with a grounding contact pad (not shown) thereon. Spring clip 27 is deflected slightly by circuit board 58, and resiliently biases circuit board 58 downwardly to further mechanically secure module 22 to connector 24 while providing an additional path for coupling module 22 to the ground potential of assembly 20.

When electrical contact is made, ears 66 and 68 at the end of connector 24 engage slots 70 and 72, respectively, in the forwardmost portion of enclosure 32 in response to relative movement in the Z direction. The edges of slots 70 and 72 resist movement of ears 66 and 68 in the Y direction and thereby secure module 22 against lifting or rising away from connector 24. In this position, contacts 40 remain deflected and provide a spring force to maintain good electrical contact. In addition or alternatively to this engagement between ears 66 and 68 and slots 70 and 72, an engagement is contemplated between ears 66 and 68 and flanges 55 and 57.

To further secure module 22 to connector 24 when electrical contact is made, module 22 includes a latch having a triangular tab 74 that snaps into a triangular opening 76 in a resilient extension 75 of guide rail 38 in response to relative movement in the Z direction, as illustrated in FIG. 7. To release the latch, the user depresses the resilient extension of guide rail 38 and disengages it from tab 74. The user can then slide module 22 on guide rail 38 away from assembly 20. The mating parts disengage and electrical contact is broken in the reverse manner from that described above.

The connector system of the present invention is easy to use because, from the user's perspective, all of the relative motion between module 22 and assembly 20 is in the Z direction. The wedge mating action of the present invention inhibits excessive wiping and attendant contact wear.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. An electrical connector, comprising:
    a body having a guide member elongated between a first end and a second end along a first axis, said body having a connector block at said first end, said connector block having a wedge shape inclined at an angle having a vertex defined by a second axis perpendicular to said first axis and between said first and second ends, said body having an upper surface and a lower surface; and
    a plurality of contacts retained in said connector block, each contact having an upper portion and a lower portion, said upper portion extending above said upper surface of said body and resiliently deflectable in substantially the direction of a third axis perpendicular to said first and second axes, said lower portion substantially flush with said lower surface of said body for surface-mounting to contact pads of a printed circuit card.

2. The electrical connector claimed in claim 1, wherein said body has a maximum height less than about 9.8 millimeters and a maximum width less than about 13.5 millimeters.

3. The electrical connector claimed in claim 1, wherein said body further comprises a retainer for engaging a complement retainer on a mating connector in response to movement of said mating connector from said second end of said guide member toward said first end of said guide member along said first axis, said retainer having a portion aligned with and further from said lower surface of said body than a portion of said complementary retainer along said third axis to resist movement of said mating connector away from said upper surface of said body along said third axis when said connectors are mated.

4. The electrical connector claimed in claim 3, wherein said body comprises two of said retainers spaced along said seed axis at opposing edges of said body.

5. The electrical connector claimed in claim 1, further comprising a clip for engaging a portion of a mating connector, said clip having a resiliently deflectable portion spaced above said upper surface of said body to exert a retaining force in the direction of said third axis upon said portion of said mating connector when deflected by said portion of said mating connector.

6. The electrical connector claimed in claim 1, wherein said body comprises a plurality of secondary contacts spaced said connector block, each secondary contact having an upper portion at an upper surface of said guide member and a lower surface at a lower surface of said guide member.

7. The electrical connector claimed in claim 1, wherein said body further comprises a latch portion for engaging a complementary latch portion on a mating connector in response to movement of said mating connector from said second end of said guide member toward said first end of said guide member along said first axis, said latch portion having a portion aligned with and closer to said second end of said body along said first axis than a portion of said complementary latch portion to resist movement of said mating connector away from first end of said body along said first axis when said connectors are mated.

8. The electrical connector claimed in claim 1, wherein said upper portion of at least one of said contacts is longer than said upper portion of another one of said contacts.

9. A connector, comprising:
    a body having a guide member elongated between a first end and a second end along an axis, said body having a connector block at said first end; and
    a plurality of rows of contacts, each row spaced from an adjacent row along said first axis, each row having a plurality of contacts arrayed along a second axis perpendicular to said first axis and retained in said connector block, each contact having an upper portion and a lower portion, said upper portion extending above said upper surface of said body and resiliently deflectable in substantially the direction of a third axis perpendicular to said first and second axes, said upper portion of each contact of a given row closer to said lower surface of said body than said upper portion of each contact of another row closer to said first end of said body, said lower portion of each contact substantially flush with said lower surface of said body for surface-mounting to contact pads of a printed circuit card.

10. The electrical connector claimed in claim 9, wherein said body has a maximum height less than about 9.8 millimeters and a maximum width less than about 13.5 millimeters.

11. The electrical connector claimed in claim 9, wherein said body further comprises a retainer for engaging a complementary retainer on a mating connector in response to movement of said mating connector from said second end of said guide member toward said first end of said guide member along said first axis, said retainer having a portion aligned with and further from said lower surface of said body than a portion of said complementary retainer along said third axis to resist movement of said mating connector away from said upper surface of said body along said third axis when said connectors are mated.

12. The electrical connector claimed in claim 11, wherein said body comprises two of said retainers spaced along said second axis at opposing edges of said body.

13. The electrical connector claimed in claim 9, further comprising a clip for engaging a portion of a mating connector, said having a resiliently deflectable portion spaced above said upper surface of said body to exert a retaining force in the direction of said third axis upon said portion of said mating connector when deflected by said portion of said mating connector.

14. The electrical connector claimed in claim 9, wherein said body comprises a plurality of secondary contacts spaced from said connector block, each secondary contact having an upper portion at an upper surface of said guide member and a lower surface at a lower surface of said guide member.

15. The electrical connector claimed in claim 9, wherein said body further comprises a latch portion for engaging a complementary latch portion on a mating connector in response to movement of said mating connector from said second end of said guide member toward said first end of said guide member along said first axis, said latch portion having a portion aligned with and closer to said second end of said body along said first axis than a portion of said complementary latch portion to resist movement of said mating connector away from first end of said body along said first axis when said connectors are mated.

16. The electrical connector claimed in claim 9, wherein said upper portion of at least one of said contacts is longer than said upper portion of another one of said contacts.

17. An electrical connector system, comprising:
- a first electrical connector having a body with a guide member elongated between a first end and second end of said body along a first axis, said body having a connector block at said first end with a plurality of contacts arrayed in a first plane inclined at an angle having a vertex line defined by a second axis between said first and second ends and perpendicular to said first axis; and
- a second electrical connector having a having a body slideably engageable with said first electrical connector in a direction along said first axis, said second electrical connector having a plurality of second contacts arrayed in a second plane inclined at an angle with respect to said first axis complementary to said angle at which said first plane is inclined when said second electrical connector is engaged with said first electrical connector.

18. The electrical connector system claimed in claim 17, wherein said second electrical connector is included in an optical transceiver module.

19. The electrical connector system claimed in claim 18, wherein:
- said connector block has a wedge shape having an upper surface in said first plane; and
- each contact of said connector block has an upper portion and a lower portion, said upper portion protrudes above said upper surface of said connector block and is resiliently deflectable in substantially the direction of a third axis perpendicular to said first and second axes, and said lower portion is substantially flush with a lower surface of said body for surface-mounting to contact pads of a printed circuit card.

20. An optoelectronic module, comprising:
- a body having a guide flange slideably engageable with an elongated guide member along an axis;
- a plurality of electrical contacts at a first end of said body arranged in a plane inclined at an angle with respect to said axis;
- an optical coupling at a second end of said body mechanically and optically mateable with a mating optical cable coupling; and
- optoelectronics for communicating digital signals between said plurality of electrical contacts and said optical coupling.

21. The optoelectronic module claimed in claim 20, wherein said plurality of electrical contacts are pads on a planar circuit card inclined at said angle.

22. The optoelectronic module claimed in claim 21, wherein said pads are elongated and have non-uniform lengths.

23. A method for connecting an electrical connector to a mating connector, the electrical connector comprising a body and a plurality of contacts, said body having a guide member elongated between a first end and a second end along a first axis, said body having a connector block at said first end, said connector block having a wedge shape inclined at an angle having a vertex defined by a second axis perpendicular to said first axis and between said first and second ends, said body having an upper surface and a lower surface, said a plurality of contacts retained in said connector block, each contact having an upper portion and a lower portion, said upper portion extending above said upper surface of said body and resiliently deflectable in substantially the direction of a third axis perpendicular to said first and second axes, said lower portion substantially flush with said lower surface of said body and surface-mounted to contact pads of a printed circuit card, the method comprising the steps of:
- engaging a complementary guide portion of said mating connector with said guide portion of said body; and
- moving said mating connector from said second end of said guide member toward said first end of said guide member along said first axis until a plurality of complementary contacts of said mating connector make electrical contact with and deflect said upper portions of said plurality of contacts of said electrical connector, said plurality of contacts of said mating connector defining a plane inclined with respect to said first axis at an angle complementary to said angle of said wedge shape.

24. The method claimed in claim 23, wherein said moving step comprises the step of moving an enclosure of said mating connector having a maximum height less than about 9.8 millimeters and a maximum width less than about 13.5 millimeters.

25. The method claimed in claim 23, wherein said moving step comprises the step of moving said enclosure through a transceiver port opening in an electronic assembly enclosure.

26. The method claimed in claim 23, wherein said moving step comprises the step of moving said mating conductor from said second end of said guide member toward said first end of said guide member along said first axis until a retainer of said electrical connector engages a complementary retainer of said mating connector and said engagement resists relative movement of said electrical connector and said mating connector in a direction along said third axis.

27. The method claimed in claim 23, wherein said moving step comprises the step of moving said mating connector from said second end of said guide member toward said first end of said guide member along said first axis until a portion of said mating connector resiliently deflects a clip of said electrical connector and exerts a retaining force in the direction of said third axis upon said portion of said mating connector.

28. The method claimed in claim 23, wherein said moving step comprises the step of moving said mating connector from said second end of said guide member toward said first end of said guide member along said first axis until a latch portion of said electrical connector engages a complementary latch portion of said mating connector and said engagement resists relative movement of said electrical connector and said mating connector in a direction along said first axis until said latch portion of said electrical connector and said complementary latch portion of said mating connector are operated to release the engagement.

29. A method for connecting an electrical connector to a mating connector, the electrical connector comprising a body and a plurality of rows of contacts, said body having a guide member elongated between a first end and a second end along an axis , said body having a connector block at said first end, each row of contacts spaced from an adjacent row along said first axis, each row having a plurality of contacts arrayed along a second axis perpendicular to said first axis and retained in said connector block, each contact having an upper portion and a lower portion, said upper portion extending above said upper surface of said body and resiliently deflectable in substantially the direction of a third axis perpendicular to said first and second axes, said upper portion of each contact of a given row closer to said lower surface of said body than said upper portion of each contact of another row closer to said first end of said body, said lower portion of each contact substantially flush with said lower surface of said body and surface-mounted to contact pads of a printed circuit car, the method comprising the steps of:

engaging a complementary guide portion of said mating connector with said guide portion of said body; and     moving said mating connector from said second end of said guide member toward said first end of said guide member along said first axis until a plurality of complementary contacts of said mating connector make electrical contact with and deflect said upper portions of said plurality of contacts of said electrical connector, said mating connector having a plurality of rows of said complementary contacts, a complementary contact of a row making electrical contact with a contact of a row of said electrical connector simultaneously with a complementary contact of another row making electrical contact with a contact of another row of said electrical connector.

30. The method claimed in claim 29, wherein said moving step comprises the step of moving an enclosure of said mating connector having a maximum height less than about 9.8 millimeters and a maximum width less than about 13.5 millimeters.

31. The method claimed in claim 29, wherein said moving step comprises the step of moving said enclosure through a transceiver port opening in an electronic assembly enclosure.

32. The method claimed in claim 29, wherein said moving step comprises the step of moving said mating connector from said second end of said guide member toward said first end of said guide member along said first axis until a retainer of said electrical connector engages a complementary retainer of said mating connector and said engagement resists relative movement of said electrical connector and said mating connector in a direction along said third axis.

33. The method claimed in claim 29, wherein said moving step comprises the step of moving said mating connector from said second end of said guide member toward said first end of said guide member along said first axis until a portion of said mating connector resiliently deflects a clip of said electrical connector and exerts a retaining force in the direction of said third axis upon said portion of said mating connector.

34. The method claimed in claim 29, wherein said moving step comprises the step of moving said mating connector from said second end of said guide member toward said first end of said guide member along said first axis until a latch portion of said electrical connector engages a complementary latch portion of said mating connector and said engagement resists relative movement of said electrical connector and said mating connector in a direction along said first axis until said latch portion of said electrical connector and said complementary latch portion of said mating connector are operated to release the engagement.

* * * * *

UNITED STATES PATENT AND TRADEMARK OFFICE
CERTIFICATE OF CORRECTION

PATENT NO. : 5,980,324

DATED : Nov. 9, 1999

INVENTOR(S) : Jerry Berg; David Peter Gaio and William Kim Hogan

It is certified that error appears in the above-identified patent and that said Letters Patent is hereby corrected as shown below:

Title page, Col. 2, Line 1, "Lawerence" should be --Lawrence--.

Signed and Sealed this

Thirtieth Day of May, 2000

Attest:

Attesting Officer

Q. TODD DICKINSON

Director of Patents and Trademarks